No. 784,724.

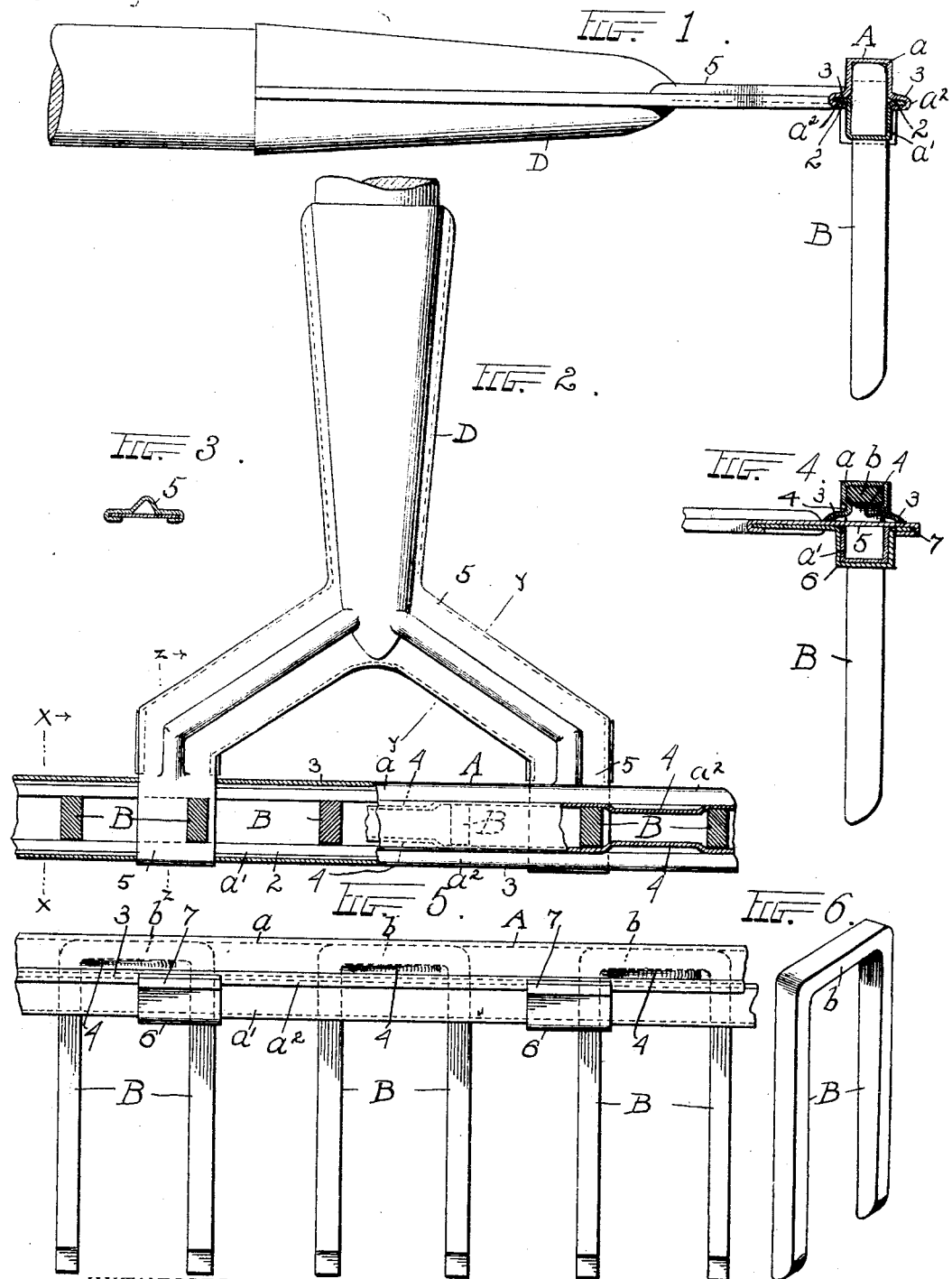

Patented March 14, 1905.

UNITED STATES PATENT OFFICE.

WILLIAM C. WINFIELD, OF WARREN, OHIO, ASSIGNOR TO THE WARREN SHEET METAL CO., OF WARREN, OHIO, A CORPORATION.

HAND-RAKE.

SPECIFICATION forming part of Letters Patent No. 784,724, dated March 14, 1905.

Application filed September 6, 1904. Serial No. 223,407.

*To all whom it may concern:*

Be it known that I, WILLIAM C. WINFIELD, a citizen of the United States, residing at Warren, in the county of Trumbull and State of Ohio, have invented certain new and useful Improvements in Hand-Rakes; and I do declare that the following is a full, clear, and exact description of the invention, which will enable others skilled in the art to which it appertains to make and use the same.

My invention relates to hand-rakes; and the object of the invention is to provide a metallic rake which will take the place of the well-known malleable cast-metal rake, which is heavy and easily broken; and the invention consists in a rake constructed out of sheet metal and which is materially lighter than the cast-metal rake as well as stronger and more durable, all substantially as shown and described, and particularly pointed out in the claims.

In the accompanying drawings, Figure 1 is a cross-sectional view of the rake-head on line $x\:x$, Fig. 2, and an outside view of the handle-socket and arms; and Fig. 2 is a plan view of the rake with portions of the head and teeth in section. Fig. 3 is a cross-section of one of the handle or socket arms on line $y\:y$, Fig. 2; and Fig. 4 is a cross-section of the head at the point where one of the arms is connected therewith on line $z\:z$, Fig. 2. Fig. 5 is a rear elevation of a portion of the rake-head and the teeth or tines therein, and Fig. 6 is a perspective view of the double form of tines or teeth.

As thus shown, the head A of the rake is constructed of two pieces or strips $a$ and $a'$ of comparatively light sheet metal bent longitudinally into substantially trough or channel shape of right-angled outline in cross-section, as clearly seen in Fig. 1, and the said channel-pieces have their edges bent laterally at right angles and clamped or locked together by engaging the edges 2 of the lower plate $a'$ between the doubly or reversely bent edges 3 of the upper plate $a$ clamped thereon. This forms a three-ply rib $a^2$ midway along each side of head A, which contributes very materially to its strength and enables me to make the head materially smaller and lighter than would be practicable if these ribs were not present. Thus the head of the rake is formed of the two channeled pieces or sections rigidly connected along each side lengthwise centrally, and the lower strip has holes to receive the teeth B, which are inserted through said holes from above before the parts of the head are assembled.

It will be noticed that the connecting portion $b$ of the double teeth B is a straight portion which rests up against the top of the head, and the teeth are tightened and made rigid in the head by crimping or contracting the head on one or both sides immediately beneath the cross portion $b$, as indicated at 4, Fig. 4, thus clamping the teeth firmly in place. All the teeth are secured in this way, and the crimping is produced at intervals just above the side ribs $a^2$ at each side and between the teeth proper.

The handle-socket D and its arms are made up separately and consist of two comparatively light sheets or pieces of sheet metal cut and bent to the requisite shape to produce the socket and arms and which are united along their edges by overlapping and locking one edge upon the other, substantially as seen in cross-section, Fig. 3, the upper plate in this instance being flanged around the edge of the lower plate and beaded lengthwise at its top to increase its strength. The extremities of said arms are engaged with the head A, as seen in Fig. 4, wherein the upper plate or strip of metal 5 is shown as extending centrally through head A to the rear thereof, while the lower plate or strip 6 is bent to conform closely to the outside of the head at its front, bottom, and rear, and has its end locked within the reversely-bent portion 7 of the top strip or plate. I may also engage one of the teeth B through each of the plates 6, if preferred.

What I claim is—

1. In hand-rakes, a rake-head formed of two sections of channeled sheet metal clamped together along their edges and the said edges extending laterally and forming strengthening-ribs on opposite sides of the head, substantially as described.

2. In hand-rakes, a rake-head formed of two pieces of channeled sheet metal interlocked along their edges at the sides of the head, and rake-teeth clamped in said head and extending through the bottom thereof, substantially as described.

3. In hand-rakes, a rake-head formed of two channeled sheet-metal pieces having their edges bent outward at right angles and the edges of one piece overlapped on both sides and clamped within the edges of the other piece, and teeth projecting through the bottom of the head and clamped in the upper portion thereof, substantially as described.

4. In hand-rakes, a handle-socket and diverging arms engaging the head of the rake, and constructed of two pieces of sheet metal clamped one upon the other along their edges and the said arms having one portion extending through said head and the other portion about the outside thereof and both portions interlocked at the rear of the head, substantially as described.

5. In hand-rakes, a hollow sheet-metal head and a handle-socket and arms formed of two pieces of sheet metal interlocked along their edges and one of said pieces extending through said head from front to rear and the other piece bent around beneath the head and interlocked with the first-named piece at its end, and teeth locked in said head, substantially as described.

In testimony whereof I sign this specification in the presence of two witnesses.

WILLIAM C. WINFIELD.

Witnesses:
M. J. SLOAN,
CHAS. B. SELBY.